United States Patent [19]

Degrémont

[11] Patent Number: 4,568,054
[45] Date of Patent: Feb. 4, 1986

[54] SEAT MOUNT FOR A MOTOR VEHICLE

[75] Inventor: Dominique Degrémont, Sully-sur-Loire, France

[73] Assignee: Compagnie Industrielle de Mecanismes, France

[21] Appl. No.: 501,677

[22] Filed: Jun. 6, 1983

[30] Foreign Application Priority Data

Jun. 9, 1982 [FR] France .................................. 82 10043

[51] Int. Cl.⁴ .............................................. B60N 1/08
[52] U.S. Cl. ..................................... 248/429; 248/393
[58] Field of Search ............... 248/548, 424, 429, 430, 248/550, 393; 74/543, 536, 523, 524, 526, 527

[56] References Cited

U.S. PATENT DOCUMENTS 3,866,876 2/1975 Adams ................................. 248/429
3,921,471 11/1975 Smith .................................... 74/543

Primary Examiner—Reinaldo P. Machado
Assistant Examiner—Alvin Chin-Shue

[57] ABSTRACT

This mount is of the type comprising two pairs of slides 1B each comprising a slide connected to the floor of the vehicle and a movable slide which carries an unlocking lever 5B mounted to rotate about a horizontal axis, and an essentially rigid member 8 for ensuring a synchronized actuation of the two levers. According to the invention, this mount comprises means 13B, 14B for allowing the pair of slides the closest to the longitudinal axis of the vehicle to tilt forwardly relative to the other pair of slides and shift therewith its lever, at least in the event of a sudden relative tilting.

6 Claims, 8 Drawing Figures

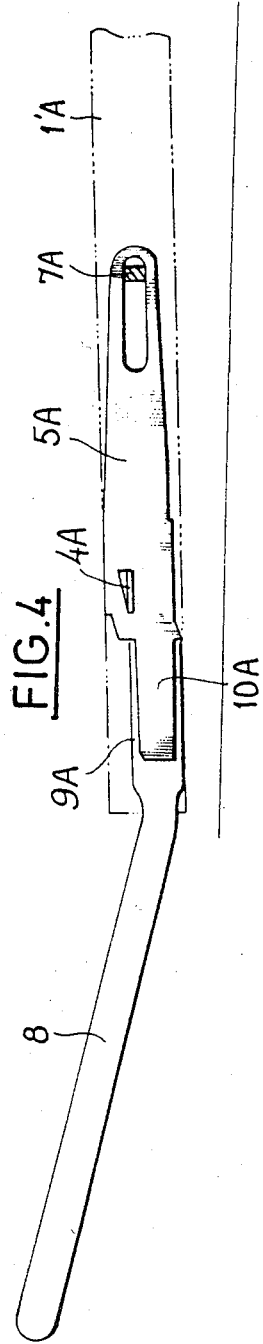
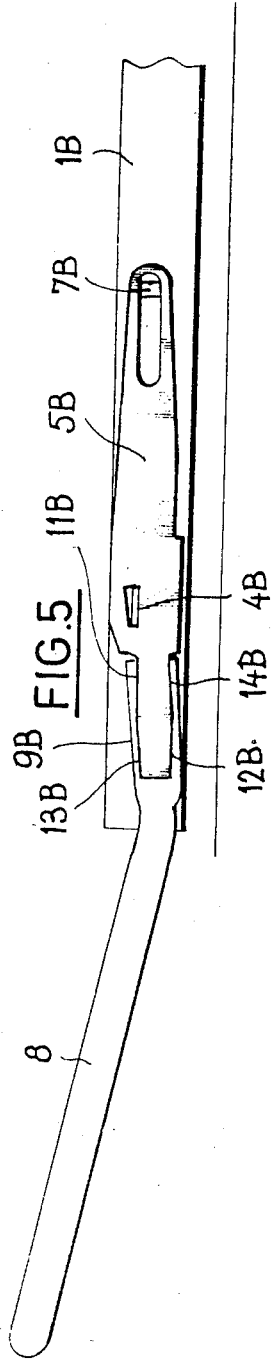
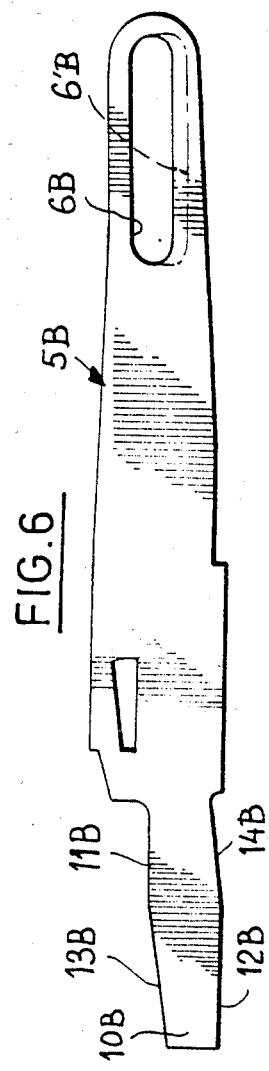

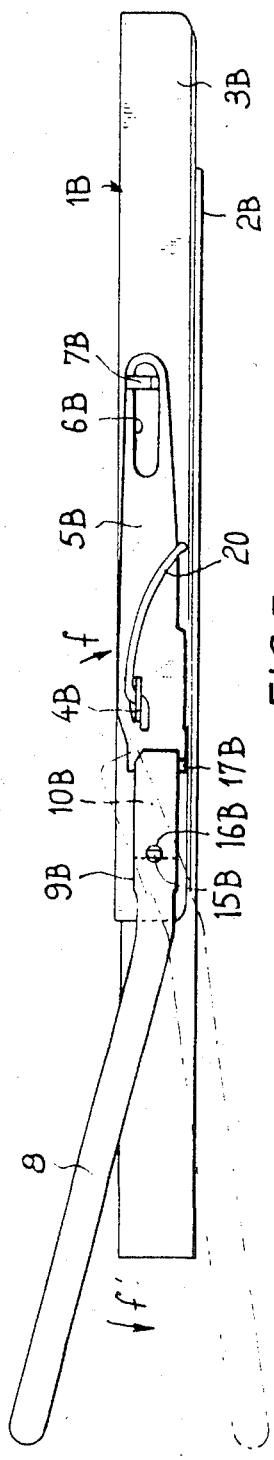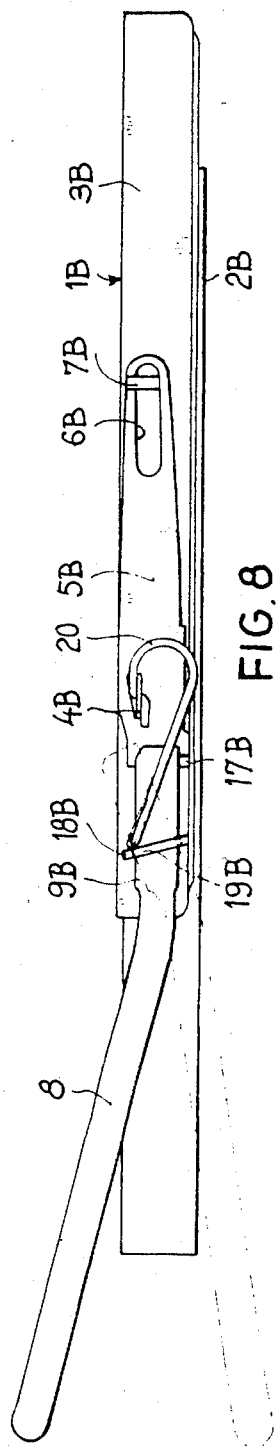

SEAT MOUNT FOR A MOTOR VEHICLE

The present invention relates to a seat mount for a motor vehicle, of the type comprising two pairs of slides, each comprising a fixed slide connected to the floor of the vehicle and a movable slide which carries an unlocking lever mounted to rotate about a horizontal axis, and an essentially rigid means for a synchronized actuation of the two levers.

A conventional seat mount of this type is illustrated diagrammatically in FIGS. 1 and 2 of the accompanying drawings, respectively in plan and in side elevation, to an enlarged scale, and in section taken on line 2—2 of FIG. 1.

The two pairs of slides 1A and 1B of this mount are both located on the same side (the left side in the illustrated embodiment) of the longitudinal axis X—X of the vehicle. In the following description, the corresponding elements of the two pairs of slides will be designated by the same numeral together with suffixes A and B when it concerns the pair the closest to the axis X—X or the pair the most remote from this axis respectively.

The mount is symmetrical with respect to its median axis Y—Y which is parallel to the axis X—X. Each pair of slides 1 comprises a fixed inner slide 2 fixed to the floor of the vehicle and a movable outer slide 3 which is fitted on the inner slide 2 with interposition of rolling elements (not shown). The slides 1A have been shown diagrammatically in dot-dash lines in FIG. 2 which also has a horizontal reference line D.

Pivotally mounted on a formed-over horizontal tab 4 provided on the outer side (relative to the axis X—X) of the slide 3 is a generally planar unlocking lever 5. The rear end of this lever has a horizontal slot 6 through which extends a lug 7 pertaining to a locking means. The latter is formed by a small cylinder disposed in the rolling track adjacent to the lever 5; projecting from the side opposed to the lug 7 on the cylinder is a nose portion which extends through an opening in the movable slide 3.

When the lever 5 is in its position of rest shown in FIG. 2, in which it is maintained by a spring (not shown), the nose portion of the locking means enters one of a series of openings in the fixed slide 2 and determines a fixed longitudinal position of the movable slide. In order to modify this position, the lever 5 is turned in its vertical plane in the clockwise direction (as viewed in FIG. 2) f about the tab 4. This movement drives the lug 7 downwardly and this extracts the nose portion from the opening of the fixed slide and enables the other slide to be shifted. When the new desired position is reached, the lever 5 is released and returns to its initial position under the action of its return spring and allows the nose portion to enter the confronting opening in the fixed slide 2.

The two levers 5 are actuated in synchronism by a single rigid member 8 in the form of a tubular arch member. The flattened end portions 9 of this arch member extend rearwardly and are fitted on the front end portions 10 of the two levers 5 while its median portion 8a extends beyond the front of the seat. Thus the simultaneous unlocking of the two pairs of slides occurs by raising the median portion 8a of the arch member and their simultaneous locking is achieved by releasing the arch member 8.

In the known mounts of this type, it has been found that the following undesirable phenomenon occurs: in the event of an impact from the front, the part of the floor of the vehicle located close to the axis X—X is often distinctly more deformable than those located close to the lateral longitudinally-extending members of the chassis of the vehicle. Consequently, the exterior pair of slides 1B remains practically horizontal while the other pair of slides 1A tilts forwardly roughly about its front end, as shown in dot-dash lines at 1'A in FIG. 2.

Now, each end of the arch member 8 is rigidly integral with the corresponding end portion 10 and the levers 5 are in a position of abutment which prevents them from turning in the counter-clockwise direction f'. Consequently, when the pair of slides 1A tilts forwardly, the end 9B of the arch member cannot follow this movement and, in bearing against the end portion 10B, immobilises the whole of the arch member and in particular its other end 9A and consequently the lever 5A. Therefore, a relative movement is produced between the pair of slides 1A and the lever 5A which corresponds to the unlocking movement relating to this pair of slides. In other words, there is a serious risk that the pair of slides 1A becomes unlocked in the event of impact, in particular when, in accordance with a tendency which is becoming more common at the present time, the buckles of the safety belts of the vehicle are fixed directly to the seat.

It will be understood that the same problem arises on the outer side if the arch member 8 is of the type actuated by a depression thereof and not by a raising thereof, and that it exists more generally for all the mounts in which the two synchronized unlocking levers pivot in vertical planes parallel to the axis X—X.

An object of the present invention is to provide a mount of the same type which guarantees that the locking of the two pairs of slides is maintained in the event of impact.

The invention accordingly provides a mount of the aforementioned type, which comprises means for enabling the pair of slides 1A the closest to the longitudinal axis X—X of the vehicle to tilt forwardly with respect to the other pair of slides 1B and displace therewith its lever 5A, at least in the event of a sudden relative tilting.

In a first embodiment of the invention, said means enable the outer end 9B of the actuating member 8 to tilt freely forwardly with respect to the outer lever 5B while the other end 9A of this means is rigid with the inner lever 5A.

This can be achieved very easily with a minor modification of the conventional mounts, when the outer end 9B of the arch member 8 is tubular and fitted on the front end portion 10B of the outer lever 5B which has two forwardly inclined parallel bevels the upper chamber being forwardly offset relative to the lower bevel In a modification, the outer end 9B of the arch member 8 is pivotally mounted on the front end portion 10B of the outer lever 5B and an abutment prevents it from tilting in the sole direction of the unlocking relative to this lever.

In other embodiments of the invention:

said means enables the outer lever 5B to tilt forwardly relative to the associated locking means 7B, each lever being rigidly connected to the arch member 8 and this locking means having its own means for returning it to its locking position;

the arch member 8 is rigidly connected to the two levers 5 and is formed by two halves interconnected with possibility of rotation, in particular by a tubular fitting of one inside the other;

the unlocking mechanism has a weakened point so as to yield in the event of a sudden relative tilting of the inner pair of slides 1A relative to the other pair 1B.

FIGS. 3 to 8 of the accompanying drawings diagrammatically illustrate some embodiments of the mount according to the invention:

FIGS. 4 and 5 are views similar to FIGS. 2 and 3 respectively of the inner pair of slides and the outer pair of slides respectively of the same mount, after an impact from the front;

FIG. 6 is a view to an enlarged scale of the lever of the outer pair of slides;

FIGS. 7 and 8 are views similar to FIG. 3 showing respectively the outer pair of slides of two other embodiments of the mount according to the invention.

Figure 1:
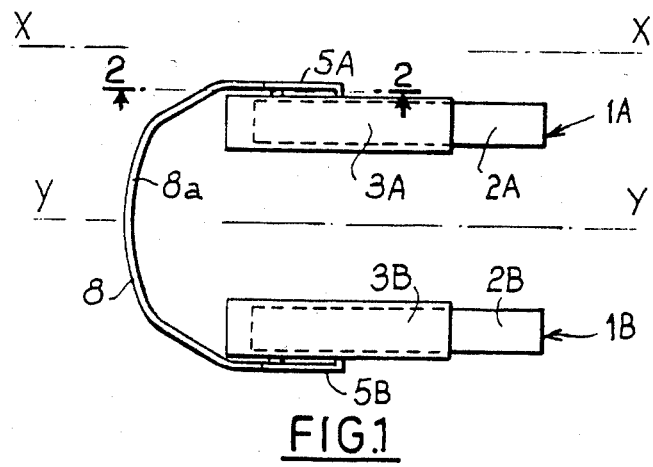
Figure 2:
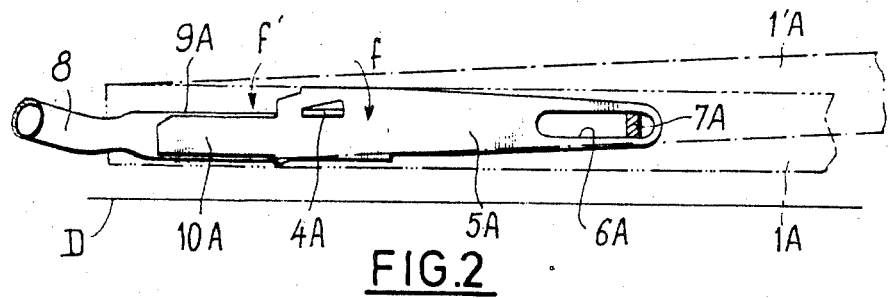
Figure 3:
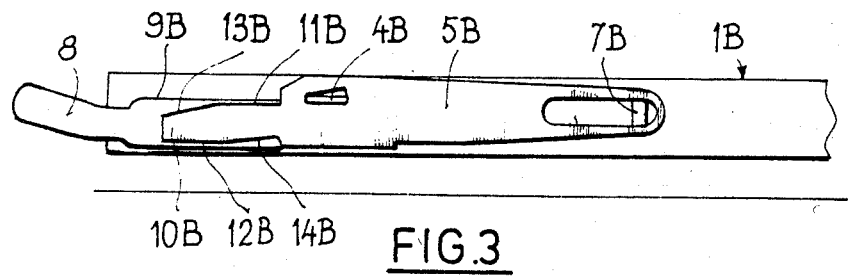
FIG. 3 is a side elevational view of the outer pair of slides of a mount according to the invention, in normal operation.

In the embodiment shown in FIGS. 3 to 6, the mount is generally identical to that of FIGS. 1 to 2. It differs therefrom only in respect of the form of the forward end portion 10B of the lever 5B of the outer pair of slides 1B. Indeed, while in FIGS. 1 and 2 this front end portion had a rectangular shape exactly adapted to the flattened tubular end portion 9B of the arch member 8 and defined by an upper edge 11B and a lower edge 12B which are parallel and horizontal, these two edges are now modified by an upper bevel 13B and a lower bevel 14B which are parallel to each other and longitudinally offset.

More precisely, the upper bevel 13B extends downwardly and forwardly from the middle of the length of the edge 11B, and the lower bevel 14B extends upwardly and rearwardly from the middle of the length of the edge 12B.

Thus, in normal operation, the arch member 8 is positioned by its rigid connection to the inner lever 5A and, on the outer side, it bears against the two horizontal semi-edges 11B and 12B. In the event of an impact from the front (FIGS. 4 and 5), the lower pair of slides 1A is the sole pair to tilt forwardly and the bevels 13B and 14B allow the arch member 8 to follow freely this movement and therefore allow its inner end portion 9A and the inner lever 5A to tilt in the same way. Consequently, no unlocking of the pair of inner slides is to be feared. The angle of the bevels 13B and 14B is of course made large enough to correspond to the maximum differential deformation to be expected between the two concerned parts of the floor of the vehicle, the maximum inclination of the arch member being defined by the abutment of its end portion 9B against the bevels 13B and 14B. By way of example, this angle may be of the order of 10° to 15° or more.

In the embodiment shown in FIG. 7, the outer end portion 9B of the arch member is no longer tubular but planar and applied against the outer face of the front end portion 10B. The latter does not have any bevels, but an end lug 15B bent outwardly at a right angle and extending through a circular aperture 16B formed in the end portion 9B. Further, at the base of the end portion 10B, the lever 5B has another lug 17B which is bent outwardly at a right angle and against which the free end of the lower edge of the end portion 9B normally bears.

Here again, the arch member is rigidly connected to the lever 5B only in respect of the direction f corresponding to the unlocking of the pair of slides 1B and is free to pivot in the other direction f', in the present case by pivoting about the lug 15B as illustrated in dot-dash lines. Consequently, the same technical effect as that described hereinbefore with reference to FIGS. 3 to 6 is obtained in the event of impact.

The same type of unidirectional connection between the planar end portion 9B and the lever 5B is achieved in the modification of FIG. 8 in the following manner: the end portion 10B has instead of a lug 15B at its end throughout its height a tab 18B which is formed over outwardly at a right angle and provided with a rectangular opening 19B. The dimensions of this opening correspond to those of the section of the end portion 9B, but with an axis inclined forwardly and downwardly.

Thus, in normal operation, the end portion 9B of the arch member cooperates with the respectively front and rear ends of the upper and lower edges of the opening 19B, and also with the lug 17B. In the event of impact from the front, the end portion 9B is free to pivot forwardly to the extent allowed by the opening 19B, as illustrated in dot-dash lines.

There are shown in FIGS. 7 and 8 two possible embodiments of a return spring 20 which has one end portion extending through the free end of the tab 4. The other end portion of the spring engages in FIG. 7 the rear end portion of the lever 5 from the bottom and, in FIG. 8, the front end portion 10 and the end portion 9 of the arch member from the top.

It will moreover be understood that, by way of a modification, the same technical effect will be obtained by allowing the assembly of the arch member 8 and the outer lever 5B freedom to rotate in the direction f' opposed to the unlocking relative to the lug 7 of the outer locking means. For this purpose, it is sufficient that the lever 5B be devoid of a stop abutment in this direction and that its front end portion 10B be identical to that of FIGS. 1 and 2, ie devoid of bevels, and that the slot 16 be downwardly enlarged as shown in dot-dash lines at 6'B in FIG. 6. However, this assumes that the outer locking means has its own spring for returning it to its locking position.

It may also be envisaged to construct the arch member in two parts interconnected at the middle thereof by a connection allowing a relative rotation, for example by a tubular fitting of one part in the other, or to provide in the kinematic chain connecting the two pairs of slides to the unlocking mechanism a weakened point which yields in the event of a sudden forward tilting of the inner pair of slides with respect to the other pair of slides.

Having now described my invention what I claim as new and desire to secure by Letters Patent is:

1. An improved seat mount for a motor vehicle having a longitudinal median axis, the mount being of the type including inner and outer pairs of slide, the inner pair of slides for disposition closer to the median axis, each pair of slides including a moveable slide provided with an unlocking lever mounted thereon and a fixed slide, a rigid actuating member interconnecting the unlocking levers for synchronized actuation of same, the actuating member including an inner end portion connected to an end portion of the inner unlocking lever and an outer end portion connected to an end portion of the outer locking lever, whereby unlocking of the mount is realized by pivoting the levers in a first direction, which seat mount comprises means for connecting the outer end portion of the actuating member to the end portion of the outer unlocking lever to permit sufficient relative movement between the connected end portions and prevent unlocking of the inner pair of slides when impact of the vehicle causes the inner pair of slides to tilt forwardly in a second direction opposite to the first direction.

2. The improved seat mount of claim 1 wherein the connection means permitting sufficient relative movement includes the outer end portion of the actuating member being of a tubular configuration, the end portion of the outer unlocking lever being disposed within the tubular configuration and provided with a pair of forwardly inclined parallel bevels including an upper bevel and a lower bevel, with the upper bevel being forwardly offset relative to the lower bevel.

3. A mount according to claim 1, wherein each pair of slides has a locking device for locking one slide relative to the other slide in each pair of slides, and said means allow the lever of the outer pair of slides to tilt forwardly relative to the respective locking device, each lever being rigidly connected to the actuating member and said locking device being combined with return means for returning the locking device to a locking position thereof.

4. The improved seat mount of claim 1 wherein the outer end portion of the actuating member is pivotally mounted on the front end portion of the outer unlocking lever, and further including an abutment for engagement by the outer end portion of the actuating member to permit the latter from pivoting in the first direction relative to the outer unlocking lever.

5. A mount according to claim 4, wherein the pivotal mounting comprises a lug of the lever of the outer pair of slides, which lug extends through an aperture in the outer end portion of the actuating member.

6. A mount according to claim 4, wherein the pivotal mounting comprises an end tab on the lever of the outer pair of slides, which tab defines an opening having an axis which is forwardly and downwardly inclined and through which opening the outer end portion of the actuating member extends.

* * * * *